US012674885B2

(12) United States Patent
Vanaev

(10) Patent No.: US 12,674,885 B2
(45) Date of Patent: Jul. 7, 2026

(54) METHOD FOR OPERATING A CONTACTLESS DETECTION DEVICE FOR MONITORING AT LEAST ONE MONITORING REGION, DETECTION DEVICE, AND VEHICLE HAVING AT LEAST ONE DETECTION DEVICE

(71) Applicant: Valeo Schalter und Sensoren GmbH, Bietigheim-Bissingen (DE)

(72) Inventor: Alexander Vanaev, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 344 days.

(21) Appl. No.: 18/021,042

(22) PCT Filed: Aug. 2, 2021

(86) PCT No.: PCT/EP2021/071521
§ 371 (c)(1),
(2) Date: Feb. 13, 2023

(87) PCT Pub. No.: WO2022/033907
PCT Pub. Date: Feb. 17, 2022

(65) Prior Publication Data
US 2023/0296763 A1 Sep. 21, 2023

(30) Foreign Application Priority Data

Aug. 13, 2020 (DE) ..................... 10 2020 121 318.2

(51) Int. Cl.
*G01S 13/931* (2020.01)
*G01S 7/35* (2006.01)
(Continued)

(52) U.S. Cl.
CPC ............ *G01S 13/931* (2013.01); *G01S 7/356* (2021.05); *G01S 13/04* (2013.01); *G01S 13/865* (2013.01)

(58) Field of Classification Search
CPC ...... G01S 13/931; G01S 13/584; G01S 13/04; G01S 13/865; G01S 17/931; G01S 7/356
(Continued)

(56) References Cited

U.S. PATENT DOCUMENTS 5,812,082 A * 9/1998 Moreira .............. G01S 13/9056
342/191
5,959,574 A * 9/1999 Poore, Jr. .............. G01S 13/726
342/96
(Continued)

FOREIGN PATENT DOCUMENTS

DE 102009016480 A1 10/2010
EP 3121619 A1 1/2017
(Continued)

OTHER PUBLICATIONS

Albrecht Ludloff; "Practical knowledge of radar and radar signal processing;" Brunswick: Vieweg; 3rd, revised and expanded edition; 2002 (9 pages).
(Continued)

*Primary Examiner* — Michael W Justice
(74) *Attorney, Agent, or Firm* — Osha Bergman Watanabe & Burton LLP

(57) ABSTRACT

A method for operating a contactlessly operating detection device for monitoring at least one monitoring area is described. In the method, transmission signals are successively sent into at least one monitoring area. Transmitted signals which are reflected in the monitoring area are received with the detection device, brought into a form to be processed with an evaluation device, and processed as
(Continued)

received signals. Some of the signals are allocated to at least one signal block. Information about the monitoring area is determined from some of the received signals. Some of the received signals that follow one another in time are allocated to at least one received signal block at the receiving end of the detection device, independent of any allocations of transmission signals at the transmitting end of the detection device. Some of the received signals of the received signal blocks are subjected to signal processing in blocks.

13 Claims, 2 Drawing Sheets

(51) Int. Cl.
  *G01S 13/04*       (2006.01)
  *G01S 13/86*       (2006.01)
(58) Field of Classification Search
  USPC ............................................ 342/61, 70, 115
  See application file for complete search history.

(56)                    References Cited

U.S. PATENT DOCUMENTS

| | | | | | |
|---|---|---|---|---|---|
| 6,018,311 | A | * | 1/2000 | David | G01S 7/292 |
| | | | | | 342/162 |
| 6,404,380 | B2 | * | 6/2002 | Poore, Jr. | G01S 3/7864 |
| | | | | | 342/96 |
| 6,538,599 | B1 | * | 3/2003 | David | G01S 13/582 |
| | | | | | 342/104 |
| 6,850,616 | B2 | * | 2/2005 | Soman | H04Q 1/4575 |
| | | | | | 379/283 |
| 6,856,276 | B2 | * | 2/2005 | Barrick | G01S 13/003 |
| | | | | | 342/195 |
| RE44,807 | E | * | 3/2014 | Poore, Jr. | G01S 13/726 |
| | | | | | 342/96 |
| 8,694,306 | B1 | * | 4/2014 | Short | G10L 15/14 |
| | | | | | 704/200 |
| 8,885,152 | B1 | * | 11/2014 | Wright | G01S 7/495 |
| | | | | | 356/3.01 |
| 8,934,087 | B1 | * | 1/2015 | Stobie | G01S 7/495 |
| | | | | | 356/3.01 |
| 9,191,582 | B1 | * | 11/2015 | Wright | G01S 7/495 |
| 10,379,210 | B2 | * | 8/2019 | Jansen | G01S 13/345 |
| 10,969,466 | B2 | * | 4/2021 | Longman | G01S 13/584 |
| 11,099,267 | B2 | * | 8/2021 | Wu | G01S 7/354 |
| 11,513,187 | B2 | * | 11/2022 | Stettiner | G01S 7/356 |
| 11,513,204 | B2 | * | 11/2022 | Ain-Kedem | G01S 17/58 |
| 11,525,886 | B2 | * | 12/2022 | Stettiner | G01S 7/356 |
| 11,573,341 | B2 | * | 2/2023 | Manders | G01V 1/44 |
| 11,609,303 | B2 | * | 3/2023 | Stettiner | G01S 7/356 |
| 2002/0008657 | A1 | * | 1/2002 | Poore, Jr. | G01S 3/7864 |
| | | | | | 342/96 |
| 2002/0097860 | A1 | * | 7/2002 | Soman | H04Q 1/4575 |
| | | | | | 379/386 |
| 2003/0025629 | A1 | * | 2/2003 | Barrick | G01S 13/87 |
| | | | | | 342/159 |
| 2013/0135137 | A1 | | 5/2013 | Mulder et al. | |
| 2014/0079248 | A1 | * | 3/2014 | Short | G10L 25/18 |
| | | | | | 381/119 |
| 2016/0327633 | A1 | | 11/2016 | Kumar Y.B. et al. | |
| 2017/0023670 | A1 | * | 1/2017 | Jansen | G01S 13/343 |
| 2018/0231652 | A1 | * | 8/2018 | Rao | G01S 13/9011 |
| 2020/0025898 | A1 | * | 1/2020 | Ain-Kedem | G01S 17/58 |
| 2020/0150222 | A1 | * | 5/2020 | Longman | G01S 13/584 |
| 2020/0191940 | A1 | * | 6/2020 | Wu | G01S 13/931 |
| 2021/0156980 | A1 | * | 5/2021 | Stettiner | G01S 7/356 |
| 2021/0156981 | A1 | * | 5/2021 | Stettiner | G01S 7/356 |
| 2021/0156982 | A1 | * | 5/2021 | Stettiner | G01S 7/356 |

FOREIGN PATENT DOCUMENTS

| | | | |
|---|---|---|---|
| EP | | 3671265 A1 | 6/2020 |
| KR | 10-2017-0012054 A | | 2/2017 |

OTHER PUBLICATIONS

International Search Report and Written Opinion in corresponding International Application No. PCT/EP2021/071521, mailed Oct. 25, 2021 (12 pages).
German Search Report issued in corresponding German Application No. 10 2020 121 318.2, dated Apr. 16, 2021 (18 bages).
Office Action issued in counterpart Korean Patent Application No. 10-2023-7008296 mailed Oct. 28, 2024 (10 pages).

* cited by examiner

METHOD FOR OPERATING A CONTACTLESS DETECTION DEVICE FOR MONITORING AT LEAST ONE MONITORING REGION, DETECTION DEVICE, AND VEHICLE HAVING AT LEAST ONE DETECTION DEVICE

TECHNICAL FIELD

The invention relates to a method for operating a contactlessly operating detection device for monitoring at least one monitoring area, in which a multiplicity of transmission signals are successively transmitted into at least one monitoring area, transmission signals reflected in the at least one monitoring area are received using the detection device, if necessary put into a form that can be processed using an evaluation device, and processed as received signals, wherein at least some of the signals are allocated to at least one signal block, and information about the at least one monitoring area is ascertained from at least some of the received signals.

Furthermore, the invention relates to a contactlessly operating detection device for monitoring at least one monitoring area, having at least one transmission device for successively transmitting a multiplicity of transmission signals into the at least one monitoring area, having at least one reception device for receiving transmission signals reflected in the at least one monitoring area, and for converting the received transmission signals into received signals that can be processed using an electrical evaluation device, and having at least one electronic evaluation device for allocating at least some of the signals to at least one signal block and for ascertaining information about the at least one monitoring area from at least some of the received signals.

In addition, the invention relates to a vehicle having at least one contactlessly operating detection device for monitoring a monitoring area for objects, the at least one detection device comprising at least one transmission device for successively transmitting a multiplicity of transmission signals into the at least one monitoring area, at least one reception device for receiving transmission signals reflected in the at least one monitoring area, and for converting the received transmission signals into received signals that can be processed using an electrical evaluation device, and at least one electronic evaluation device for allocating at least some of the signals to at least one signal block and for ascertaining information about the at least one monitoring area from at least some of the received signals.

PRIOR ART

US 2016/0327633 A1 discloses an FMCW (Frequency Modulated Continuous Wave) radar system that includes a chirp profile storage component configured to store a chirp profile for each chirp of a chirp block, and a timing engine coupled with the chirp profile storage component in order to receive each chirp profile in transmission order during transmission of the chirp block, the timing engine using each chirp profile to configure an applicable chirp.

The invention is based on the object of designing a method, a contactless detection device and a vehicle of the type mentioned above that allow the monitoring of at least one monitoring area to be improved, in particular allow the signal processing of the received signals to be improved.

DISCLOSURE OF THE INVENTION

The invention achieves this object for the method in that at least some temporally consecutive received signals are allocated to at least one received signal block at the receiving end of the detection device, the allocation being independent of any allocations of transmitted signals at the transmitting end of the detection device, at least some of the received signals of at least some of the received signal blocks are subjected block by block to signal processing that is used to ascertain information about the at least one monitoring area.

According to the invention, the received signals are allocated to applicable received signal blocks at the receiving end. The received signals undergo signal processing block by block, that is to say for each or at least some of the received signal blocks. The signal processing thus takes place from received signal block to received signal block. Since the received signals are first allocated to the applicable received signal blocks at the receiver end at any allocations at the transmitter end, the received signal blocks can be structured more flexibly. It is not necessary to adapt the received signal blocks to any allocation at the transmitting end. In particular, the transmission signals can simply be transmitted continuously in the same way. Advantageously, no allocation of transmission signals to signal blocks is carried out at the transmitter end. Overall, the signal processing can be carried out more flexibly in this manner. The signal processing can take place in parallel with the reception of the reflected transmission signals and, if necessary, the conversion thereof into a suitable signal form. It is not necessary for the received signal blocks to have fixed sizes, in particular time windows having fixed temporal lengths. The received signals can be transmitted continuously at a particular defined transmission rate and allocated to the received signal blocks. The received signal blocks can be defined as required at the receiving end.

The detection device can be used to put the reflected transmission signals, if necessary, into a form that can be processed using an evaluation device. If the reflected transmission signals already have a form that can be processed using the evaluation device, the reflected received transmission signals can be processed further directly as received signals. Otherwise, the reflected transmission signals are converted into a form that can be processed using the evaluation device.

The reflected received transmission signals can advantageously be converted into electrical received signals that can be processed using an applicable electrical evaluation device. In this way, transmission signals can also be used in a form that cannot be directly processed electrically. Electromagnetic signals, in particular radar signals or optical signals, or sound signals or the like, can advantageously be used as transmission signals and converted into electrical received signals at the receiving end.

Advantageously, the detection device can be used to ascertain distances and/or speeds and/or directions of objects relative to the detection device. The received signal blocks can be very flexibly adapted at the receiving end.

In one advantageous configuration of the method, at least one of the received signals can be allocated to at least two temporally overlapping received signal blocks and/or at least one received signal can be allocated to a time gap between at least two temporally consecutive received signal blocks.

The allocation of at least one of the received signals to at least two temporally overlapping received signal blocks in equal measure allows an update rate during detection to be increased. Longer measuring times and higher resolutions, in particular speed resolution, especially Doppler resolution, can thus be facilitated. Higher update rates during detection can allow better and more reliable tracking of target objects.

Overlapping received signal blocks can be used in particular for detection devices that are used in conjunction with driver assistance systems of vehicles. This allows in particular detection of the surroundings to be improved in a monitoring area in the surroundings of the vehicle.

The allocation of at least one received signal to a time gap between at least two temporally consecutive received signal blocks allows the time in the time gap to be used for signal processing. Furthermore, it is thus possible to save storage space during the signal processing.

In a further advantageous configuration of the method, at least two received signal blocks can be allocated the same number of received signals and/or at least two received signal blocks can be assigned the same temporal length, and/or at least two received signal blocks can be allocated a different number of received signals and/or at least two received signal blocks can be assigned different temporal lengths.

Allocating the same number of received signals to the received signal blocks allows the received signal blocks to be made uniform overall.

The received signal blocks can advantageously have the same temporal length. In this way, the time characteristics of the received signal blocks can be compared more easily. If the received signals have the same temporal length, the same temporal length of the received signal blocks can result in each received signal block being allocated the same number of received signals.

Allocating a different number of received signals to the at least two received signal blocks allows the received signal blocks to be made more flexible. At least two of the received signal blocks can advantageously be assigned different temporal lengths. In this way, longer or shorter measurements can be carried out as required.

In a further advantageous configuration of the method, at least one received signal block can be allocated at least some of the received signals that are also allocated to at least one other received signal block having a temporal length that is shorter than the length of the at least one first-mentioned received signal block. At least one received signal block can advantageously be allocated at least some of the received signals that are also allocated to at least two other received signal blocks having a temporal length that is shorter than the length of the at least one first-mentioned received signal block. In this way, a temporally longer received signal block can overlap at least one, in particular at least two, temporally shorter received signal blocks. This allows received signal blocks of different temporal length to be used to attain different resolutions when processing the accordingly allocated received signals.

The greater the temporal length of the received signal blocks, the higher the resolution when processing the accordingly allocated received signals. Appropriate overlaps between temporally short and temporally long received signal blocks allow shorter measurements to be carried out using the allocated received signals in the temporally shorter received signal blocks and simultaneously a higher resolution to be attained using the allocated received signals in the temporally longer received signal blocks.

In a further advantageous configuration of the method, all received signals that are in a time window of at least one received signal block can be allocated to this at least one received signal block completely—and/or at least some of the received signals that are in a time window of at least one received signal block can be omitted during allocation to this at least one received signal block.

The complete allocation of all received signals in the applicable time window means that greater accuracy can be attained when ascertaining the information about the at least one monitoring area. Omitting some of the received signals during allocation to the at least one received signal block allows storage space to be saved during the signal processing.

When received signals are allocated to at least one received signal block, at least some of the received signals in the time window of the at least one received signal block can advantageously be regularly or irregularly omitted. In this way, the received signals can be allocated to the applicable received signal blocks even more flexibly.

In a further advantageous configuration of the method, at least some of the transmission signals can be transmitted in the form of electromagnetic signals. Electromagnetic signals can be used to monitor a monitoring area contactlessly.

At least some of the transmission signals can advantageously be transmitted in the form of radar signals. The radar signals in this case can be transmitted in the form of so-called chirps. As is known, a chirp refers to a signal whose frequency changes over time. The frequency response of a chirp can be represented as a frequency ramp.

Advantageously, the detection device can be a frequency modulated continuous wave (FMCW) radar. In this way, the monitoring area can be monitored continuously.

The invention can also be used with other types of contactless detection devices instead of in conjunction with radar systems. The invention can advantageously be used in other types of electromagnetic detection devices, in particular optical detection devices, or ultrasonic detection devices or the like. The transmission signals and the corresponding received signals can be implemented as appropriate signal sequences, pulses or the like.

In a further advantageous configuration of the method, identical transmission signals can be transmitted regularly over time and/or identical transmission signals can be transmitted irregularly over time and/or nonidentical transmission signals can be transmitted regularly over time and/or nonidentical transmission signals can be transmitted irregularly over time.

In this way, forms of transmission signals and transmission patterns can be generated flexibly. In particular, the transmission signals can thus also be encoded. As such, different transmission signals can be transmitted simultaneously using one or more transmission devices, said signals being able to be distinguished from one another at the receiving end when received using one or more reception devices. In this way, the invention can also be used in the so-called MIMO radar system.

In a further advantageous configuration of the method, at least some of the received signals corresponding to the received signal blocks can be subjected block by block to at least one Fourier transformation.

The received signals can advantageously be subjected received signal block by received signal block to at least one discrete Fourier transformation.

The results of a first discrete Fourier transformation for the received signal blocks can advantageously be subjected to a further discrete Fourier transformation. In this way, the received signals can be subjected to a two-dimensional discrete Fourier transformation overall.

Distances, speeds and/or directions of object targets relative to the detection device can be ascertained as information about the monitoring area from the result of the at least one two-dimensional discrete Fourier transformation.

At least one discrete Fourier transformation can advantageously be carried out as fast Fourier transformations. In this way, the at least one Fourier transformation can be calculated more efficiently.

In a further advantageous configuration of the method, the detection device can be used to monitor an interior of a vehicle and/or the detection device can be used to detect the surroundings of a vehicle.

The detection device can advantageously be designed for interior monitoring for a vehicle. Alternatively or additionally, the detection device can be designed for surroundings detection for a vehicle.

The detection device can be used to detect stationary or moving object targets, in particular object targets of vehicles, people, animals, obstacles, bumps in the road, in particular potholes or rocks, roadway boundaries, open spaces, in particular parking spaces, precipitation or the like. In this case, an object target can be parts of an object, in particular body parts of a person, by which the transmission signals can be reflected.

Monitoring an interior can involve carrying out occupant detection, motion detection, in particular respiratory rate detection and/or respiratory profile detection, or the like. Monitoring the interior can involve in particular detecting movements of people, in particular of a driver. As such, in particular breathing-related chest movements, movement of the arms, the head or the like can be monitored. The detection device, in particular the allocation of received signal blocks, can be adapted flexibly to suit the requirements. In particular breathing-related chest movements can be slow compared to arm movements and therefore require a higher resolution in terms of update rate. In order to be able to detect both slow chest movements and fast arm movements using the detection device, the received signals can be allocated to different received signal blocks having different temporal lengths. The invention can also be used in conjunction with means for a fasten safety belt reminder.

The invention can be used in a vehicle, in particular a motor vehicle. The invention can advantageously be used in a land-based vehicle, in particular an automobile, a truck, a bus, a motorcycle or the like, an aircraft and/or a watercraft. The invention can also be used in vehicles that can be operated autonomously or at least semiautonomously.

Alternatively, the invention can be used in conjunction with detection devices in stationary operation.

In a further advantageous configuration of the method, at least some of the ascertained information about the monitoring area can be transferred to a control device of a vehicle with which the detection device is associated. In this way, the ascertained information can be used to operate the vehicle.

The detection device can advantageously be connected to or part of at least one electronic control device of the vehicle, in particular a driver assistance system and/or a chassis control system and/or a driver information device and/or a parking assistance system and/or a gesture recognition system or the like. In this way, at least semiautonomous operation of the vehicle can be facilitated.

Furthermore, the invention achieves the object for the detection device in that the detection device comprises means for carrying out the method according to the invention. In this way, the monitoring of at least one monitoring area can be improved.

At least some of the means of the detection device for carrying out the method according to the invention can advantageously be implemented in software and/or hardware. In this way, the means can be adapted as appropriate to suit the requirements.

At least some of the means of the detection device for carrying out the method according to the invention can advantageously be implemented using the at least one evaluation device.

In one advantageous embodiment, the detection device can comprise at least one transmission device, which can be used to transmit electromagnetic transmission signals, and at least one reception device, which can be used to receive and optionally convert reflected electromagnetic transmission signals. Electromagnetic transmission signals can be used to monitor a monitoring area contactlessly.

The detection device can advantageously be a radar system. A radar system can be used in particular in vehicles. Alternatively, the detection device can be an optical detection device, an ultrasonic detection device or the like.

In addition, the invention achieves the object for the vehicle in that the vehicle comprises at least one detection device according to the invention.

The vehicle can advantageously comprise multiple contactlessly operating detection devices, including those that operate differently. In this way, different monitoring areas outside and/or inside the vehicle can be monitored.

In one advantageous embodiment, at least one detection device can be a surroundings detection device and/or one detection device can be at least one interior monitoring device. A surroundings detection device can be used to monitor the surroundings of the vehicle. An interior monitoring device can be used to monitor an interior of the vehicle.

Moreover, the features and advantages indicated in connection with the method according to the invention, the detection device according to the invention and the vehicle according to the invention and the respective advantageous configurations thereof apply in a mutually corresponding manner and vice versa. The individual features and advantages may of course be combined with one another, wherein further advantageous effects that go beyond the sum of the individual effects may emerge.

BRIEF DESCRIPTION OF THE DRAWINGS

Further advantages, features and details of the invention will become apparent from the following description, in which exemplary embodiments of the invention are explained in greater detail with reference to the drawing. A person skilled in the art will expediently also consider individually the features that have been disclosed in combination in the drawing, the description and the claims and will combine them to form meaningful further combinations. Schematically, in the figures.

In the figures, identical components are provided with identical reference signs.

EMBODIMENT(S) OF THE INVENTION

Figure 1:
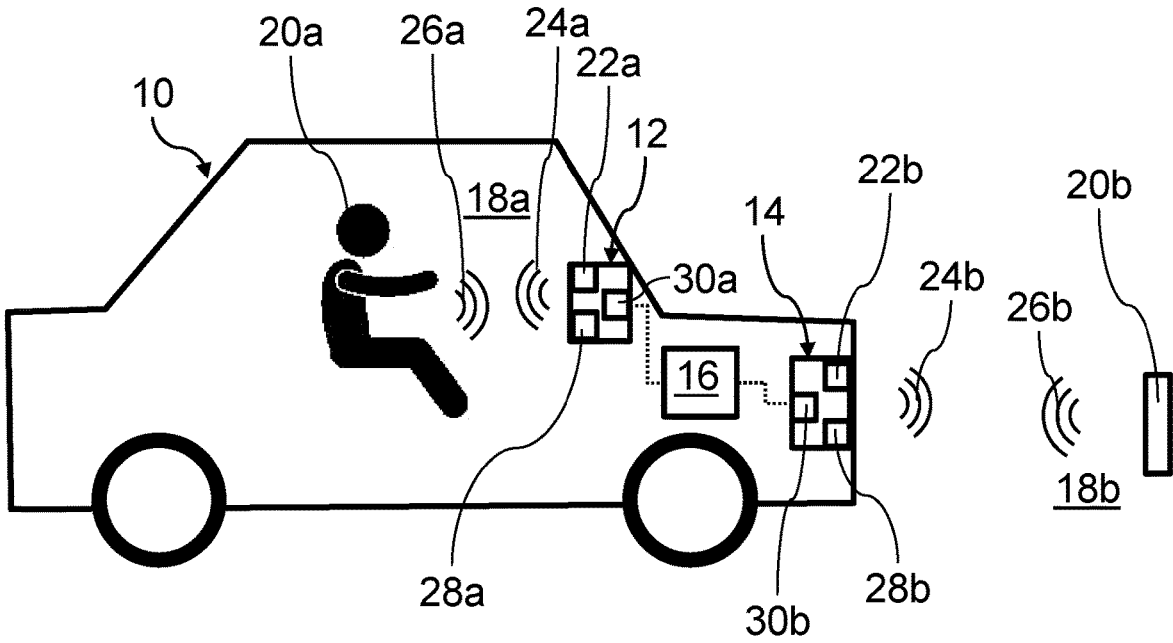
FIG. 1 shows an automobile that comprises a surroundings detection radar system, an interior monitoring radar system and a driver assistance system.

FIG. 1 schematically shows a side view of a vehicle 10 in the form of an automobile. The vehicle 10 includes, by way of illustration, two contactlessly operating detection devices in the form of radar systems, namely an interior monitoring radar system 12 and a surroundings detection radar system 14. The vehicle 10 also includes a driver assistance system 16.

The interior monitoring radar system 12 is directed into an interior monitoring area 18a in the interior of the vehicle 10. The interior monitoring radar system 12 can be used to monitor the interior monitoring area 18a. The interior monitoring radar system 12 can be used to detect occupants of the vehicle 10. By way of illustration, it is possible to detect movements of a person 20a situated in the interior monitoring area 18a, for example breathing-related movements of the chest, or movements of the head or arms. Detection of the movement of the chest can be used to carry out respiratory rate detection, for example. In addition or as an alternative to the interior monitoring radar system 12 shown, there can also be provision for other interior monitoring radar systems, including those that are oriented differently.

The surroundings detection radar system 14 is directed into a surroundings monitoring area 18b in front of the vehicle 10 in the direction of travel of the vehicle 10. The surroundings detection radar system 14 can be used to monitor the surroundings monitoring area 18b for objects 20b.

The surroundings detection radar system 14 can be used to detect stationary or moving objects 18b, in particular vehicles, people, animals, obstacles, bumps in the road, in particular potholes or rocks, roadway boundaries, open spaces, in particular parking spaces, precipitation or the like.

By way of illustration, the interior monitoring radar system 12 and the surroundings detection radar system 14 are each connected to the driver assistance system 16. The driver assistance system 16 can be used to operate the vehicle 10 autonomously or semiautonomously. Furthermore, the driver assistance system 16 can be used to influence different functions of the vehicle 10. For example, the driver assistance system 16 can thus also comprise means for occupant detection and respiratory rate detection on the basis of information about the interior monitoring area 18a. Instead of being connected to the driver assistance system 16, the interior monitoring radar system 12 can be connected to another control device, which can comprise means for occupant detection and respiratory rate detection.

The interior monitoring radar system 12 and the surroundings detection radar system 14 are each designed as frequency modulated continuous wave radar. Frequency modulated continuous wave radars are also referred to in specialist circles as FMCW radars.

By way of illustration, the interior monitoring radar system 12 comprises an interior transmission device 22a. The interior transmission device 22a is used to transmit interior transmission signals 22a in the form of so-called chirps into the interior monitoring area 18a. By way of illustration, the interior transmission signals 22a are identical and are transmitted regularly.

Figure 2:
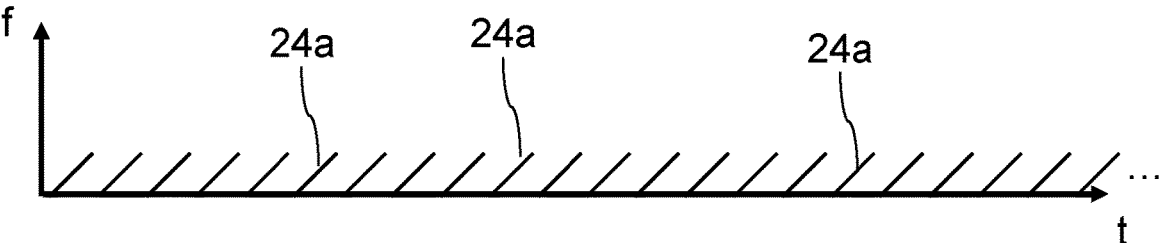
FIG. 2 uses a frequency-time graph to show interior transmission signals that are transmitted using the interior monitoring radar system into the interior of the automobile from FIG. 1.

By way of illustration, FIG. 2 shows a frequency-time graph of the interior transmission signals 24a transmitted using the interior transmission device 22a of the interior monitoring radar system 12. The interior transmission signals 24a are shown as frequency ramps.

By way of illustration, the interior monitoring radar system 12 also has an interior reception device 28a. The interior reception device 28a is used to receive interior transmission signals 24a reflected in the interior monitoring area 18a, for example by the person 20a, and to convert said signals into electrical interior received signals 26a. The electrical interior received signals 26a are transferred to an electronic interior control and evaluation device 30a of the interior monitoring radar system 12.

The interior control and evaluation device 30a is used to perform signal processing on the interior received signals 26a. For this purpose, the interior control and evaluation device 30a comprises means in software and hardware form. The interior control and evaluation device 30a is used to ascertain interior information about the interior monitoring area 18a from the received signals 26a. For example, the person 20a in the interior of the vehicle 10 can be detected in this way. Furthermore, the interior information ascertained can be movements of the chest of the person 20a, for example, and a respiratory rate determined therefrom.

The interior information about the interior monitoring area 18a is transferred to the driver assistance system 16. The driver assistance system 16 is used to influence applicable functions of the vehicle 10, for example driving functions, warnings or the like, on the basis of the interior information.

By way of illustration, the surroundings detection radar system 14 comprises a surroundings transmission device 22b. The surroundings transmission device 22b is used to transmit surroundings transmission signals 24b in the form of radar signals, for example chirps, into the surroundings monitoring area 18b. By way of illustration, the surroundings transmission signals 24b have the same form and arrangement as the interior transmission signals 24a. Alternatively, the surroundings detection radar system 14 and the interior monitoring radar system 12 also allow different transmission signals to be used.

Furthermore, by way of illustration, the surroundings detection radar system 14 has a surroundings reception device 28b. The surroundings reception device 28b is used to receive the surroundings transmission signals 24b reflected in the surroundings monitoring area 18b, for example by an object 20b, and to convert said signals into electrical surroundings received signals 26b. The electrical surroundings received signals 26b are transferred to a surroundings control and evaluation device 30b of the surroundings detection radar system 14.

The surroundings control and evaluation device 30b is used to perform signal processing on the surroundings received signals 26b. For this purpose, the surroundings control and evaluation device 30b comprises means in software and hardware form. Surroundings information about the surroundings monitoring area 18*b* is ascertained from the surroundings received signals 26*b* and transferred to the driver assistance system 16. The surroundings information is, by way of illustration, object information relating to the object 20*b*, for example a distance, a speed and/or a direction of the object 20*b* relative to the surroundings detection radar system 14.

The driver assistance system 16 can be used to influence applicable functions of the vehicle 10, for example driving functions, warnings or the like, on the basis of the surroundings information.

Figures 3, 4:
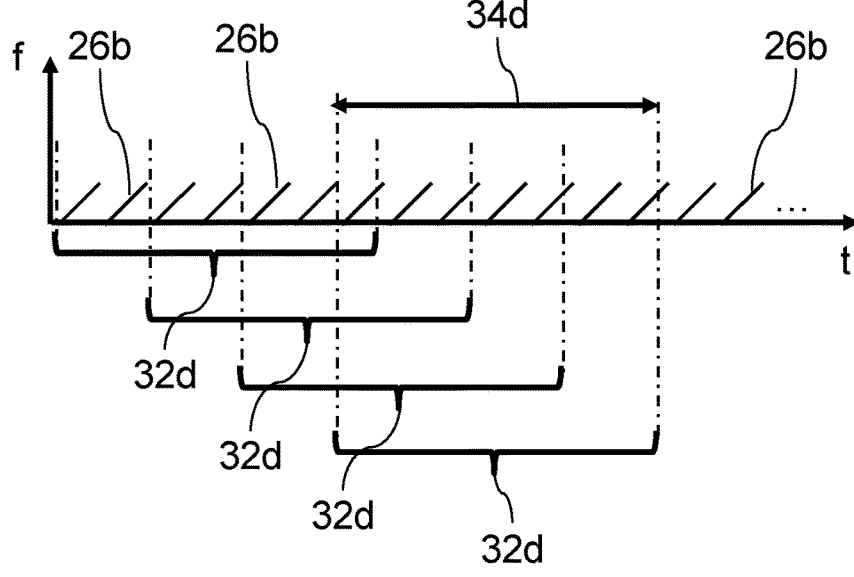
FIG. 3 uses a frequency-time graph to show interior received signals stemming from interior transmission signals from FIG. 2 that are reflected by a person in the interior of the automobile from FIG. 1, the interior received signals being allocated to received signal blocks.
FIG. 4 uses a frequency-time graph to show surroundings received signals stemming from surroundings transmission signals that are reflected by objects in the surroundings of the automobile from FIG. 1, the surroundings received signals being allocated to received signal blocks.

To process the electrical interior received signals 26*a* using the interior control and evaluation device 30*a*, the interior received signals 26*a* are allocated to, by way of illustration, three types of received signal blocks, namely first received signal blocks 32*a*, second received signal blocks 32*b* and third received signal blocks 32*c*, as shown in FIG. 3.

The first received signal blocks 32*a* each include a time window 34*a* having the same temporal length. Each interior received signal 26*a* that is in the time window 34*a* of an applicable first received signal block 32*a* is allocated to this first received signal block 32*a*. The time windows 34*a* of the first received signal blocks 32*a* each contain, by way of illustration, three of the interior received signals 26*a*.

An optional gap 36*a* is maintained between each of the first received signal blocks 32*a*. By way of illustration, the temporal length of the gaps 36*a* can correspond to the temporal length of an interior received signal 26*a*. The interior received signals 26*a* in the gaps 36*a* between two temporally consecutive first received signal blocks 32*a* cannot be allocated to any of the two aforesaid received signal blocks 32*a*, for example.

The temporal length of the second received signal blocks 32*b* corresponds to a time window 34*b*. The temporal lengths of the second time windows 34*b* correspond, by way of illustration, to the total temporal length of two of the first received signal blocks 32*a*, that is to say to the temporal length of two first time windows 34*a*, plus the intervening gap 36*a*. By way of illustration, the time windows 34*b* of the second received signal blocks 32*b* each contain seven of the interior received signals 26*a*.

Each of the second received signal blocks 32*b* temporally overlaps two of the first received signal blocks 32*a*. Furthermore, two temporally directly successive second received signal blocks 32*b* overlap in a period of time that corresponds to the temporal length of the time windows 34*a* of the first received signal blocks 32*a*.

Every second one of the interior received signals 26*a* that are within the second time window 34*b* of one of the second received signal blocks 32*b* is allocated to this second received signal block 32*b*. In this case, the second received signal blocks 32*b* are allocated the interior received signals 26*a* that are also allocated to the overlapping first received signal blocks 32*a*, and the interior received signals 26*a* in the gaps 36*a*.

The overlap between the second received signal blocks 32*b* increases an update rate during detection. Since only every second interior received signal 26*a* is allocated to the respective second received signal block 32*b*, the storage requirement during the signal processing using the interior control and evaluation device 30*a* is reduced.

The third received signal blocks 32*c* each have the temporal length of a third time window 34*c*. By way of illustration, the third received signal blocks 32*c* begin at the beginning of one second received signal block 32*b* and end at the end of the subsequent second received signal block

32*b*. In this way, each of the third received signal blocks 32*c* overlaps two of the second received signal blocks 32*b*.

Each of the third received signal blocks 32*c* is allocated every fourth one of the interior received signals 26*a* also allocated to the two second received signal blocks 32*b* overlapped by the applicable third received signal block 32*c*. Since the third received signal blocks 32*c* are each allocated only every fourth interior received signal 26*a*, the storage requirement during the signal processing is reduced. The applicable overlaps between the third received signal blocks 32*c* increases the update rate during detection.

As a result, the first received signal blocks 32*a*, the second received signal blocks 32*b* and the third received signal blocks 32*c* are allocated approximately the same number of received signals 26*a*, the received signal blocks 32*a*, 32*b* and 32*c* spanning time windows 34*a*, 34*b* and 34*c* of different length.

The time windows 34*a*, 34*b* and 34*c* of different length attain different resolutions. In this way, the method according to the invention can be used to ascertain both fast and slow movements in parallel. The highest resolution is attained with the long time windows 34*c* of the third received signal blocks 32*c*. This resolution can be used to detect slow movements. For example, chest movements of the person 20*a* can thus be detected for the purpose of respiratory rate measurement. The shorter first received signal blocks 32*a* can be used to detect fast movements, for example fast arm movements of the person 22*a*.

In the case of the interior monitoring radar system 12, received signal blocks 32*a* having appropriately longer time windows 32*c* are occasionally activated in order to monitor the respiratory rate of the person 20*a*, which requires an appropriately high resolution. In parallel, short and overlapping received signal blocks 32*b* having shorter time windows 34*b* are continually used for monitoring the interior of the vehicle 10, for example for occupant detection.

The interior received signals 26*a* are each subjected block by block to a fast Fourier transformation for all first received signal blocks 32*a*, all second received signal blocks 32*b* and all third received signal blocks 32*c*. The results of the fast Fourier transformations for the first received signal blocks 32*a* are then subjected to a further fast Fourier transformation. Furthermore, the results of the fast Fourier transformation for the second received signal blocks 32*b* are subjected to a corresponding further fast Fourier transformation. In addition, the results of the fast Fourier transformation for the third received signal blocks 32*c* are subjected to a corresponding further fast Fourier transformation.

The results of the second fast Fourier transformations are used to ascertain the interior information about the interior monitoring area 18*a*, or to ascertain movements of the person 20*a*.

To process the surroundings received signals 26*b* using the surroundings control and evaluation device 30*b*, the surroundings received signals 26*b* are each allocated to received signal blocks 32*d*, as shown in FIG. 4. The received signal blocks 32*d* that are used in the surroundings detection radar system 14 each include a time window 34*d*. The time windows 34*d* of the received signal blocks 32*d* have the same temporal length.

By way of illustration, temporally successive received signal blocks 32*d* overlap over some of their respective temporal length. Furthermore, by way of illustration, each received signal block 32*d* overlaps the respective received signal block 32*d* before last. In addition, by way of illustration, each received signal block 32*d* overlaps a respective received signal block 32*d* before the received signal block 32*d* before last. Thus, in the illustrative structure of the received signal blocks 32*d*, four respective temporally successive received signal blocks 32*d* overlap.

Each received signal 26*b* that is in a time window 34*d* of one of the received signal blocks 32*d* is allocated to this received signal block 32*d*. In this way, some received signals 26*b* are allocated to, by way of illustration, up to four received signal blocks 32*d*.

The received signals 36*b* are each subjected block by block to a fast Fourier transformation from received signal block 32*d* to received signal block 32*d*.

The results of the fast Fourier transformation of the received signal blocks 32*d* are then subjected to a further fast Fourier transformation.

Surroundings information about the surroundings monitoring area 18*b*, for example about the object 20*b*, is ascertained from the result of the two-dimensional fast Fourier transformation. By way of illustration, the object information ascertained can be a distance, a speed and a direction of the detected object 20*b* relative to the vehicle 10. The relative speed can be ascertained from a Doppler shift in the surroundings received signal 26*b*.

As a result of the multiple overlaps between the received signal blocks 32*d* of the surroundings detection radar system 14, a significant increase in the update rates during detection is attained. As such, the resolution of the Doppler shift can be improved and the speed of the object 20*b* relative to the vehicle 10 can be ascertained more precisely. The increase in the update rates during detection also allows tracking of objects to be improved. In addition, the temporal length of the received signal blocks 32*d* means that correspondingly long measurement times are attained. The longer the received signal blocks 32 are, that is to say the longer the time window 34*d*, the greater the resolution of the Doppler shift becomes.

In the case of the interior monitoring radar system 12 and the surroundings detection radar system 14, received signal blocks 32 other than those described, and also of different length, at different overlaps and/or distances can also be specified for signal processing. Since the transmission signals 24 are continuously transmitted at the transmitting end and allocation to the received signal blocks 32 takes place only at the receiving end, the received signal blocks 32 can be adapted as required. As such, received signal blocks 32 having long time windows 34 can be used in order to attain a correspondingly good resolution in regard to the Doppler shift. In addition, the received signals 26 can be processed in parallel in one or more other received signal blocks 32.

The applicable radar system 12, 14 can use relatively long received signal blocks 32 to evaluate the received signals 26, for example in order to examine a detected object more closely. In parallel, the received signals 26 can be processed using other received signal blocks 32 that have shorter time windows 34. The shorter received signal blocks 32 can be used to process the received signals 26 in parallel with lower resolution without losing time. Longer received signal blocks 32 can be activated as required and then deactivated, for example if a high resolution is not required.

The invention claimed is:

1. A method for operating a contactlessly operating transceiver for monitoring at least one monitoring area, comprising:

successively transmitting a multiplicity of transmission signals into the at least one monitoring area;

receiving transmission signals reflected in the at least one monitoring area using the transceiver, and processing the received transmission signals using a signal processor to obtain received signals, wherein the received signals comprise electrical received signals generated by converting reflected transmission signals at a receiving end of the transceiver;

allocating at least some of the received signals to a plurality of received signal blocks, wherein at least some temporally consecutive received signals are allocated to a first received signal block of the plurality of received signal blocks at the receiving end of the transceiver, the allocation being independent of any allocations of the transmission signals at a transmitting end of the transceiver, wherein at least one received signal is allocated to at least two temporally overlapping received signal blocks of the plurality of received signal blocks, wherein a second received signal block of the plurality of received signal blocks is allocated at least some of the received signals that were allocated to the first received signal block, and wherein the first received signal block has a temporal length that is shorter than the temporal length of the second received signal block; and ascertaining information about the at least one monitoring area from at least some of the received signals by subjecting at least some of the received signals of at least some of the plurality of received signal blocks independently and block by block to signal processing that is used to ascertain information about the at least one monitoring area.

2. The method as claimed in claim 1, wherein at least one received signal is allocated to a time gap between at least two temporally consecutive received signal blocks of the plurality of received signal blocks.

3. The method as claimed in claim 1, wherein, based on a predetermined uniform allocation pattern, a first plurality of received signal blocks of the plurality of received signal blocks are allocated a same number of received signals and the first plurality of received signal blocks are assigned a same temporal length, and wherein a second plurality of received signal blocks of the plurality of received signal blocks are allocated a different number of received signals and the second plurality of received signal blocks are assigned different temporal lengths.

4. The method as claimed in claim 1, wherein, based on a predetermined accurate allocation pattern, a totality of received signals that are in a time window of at least one received signal block of the plurality of received signal blocks are allocated to the at least one received signal block completely, and wherein at least some of the totality of received signals that are in the time window of the at least one received signal block are omitted during allocation to the at least one received signal block.

5. The method as claimed in claim 1, wherein at least some of the transmission signals are transmitted in the form of electromagnetic signals.

6. The method as claimed in claim 1, wherein the transmission signals comprise identical transmission signals and nonidentical transmission signals, and wherein, based on one or more predetermined transmission patterns, the transmission signals are transmitted regularly and irregularly over time.

7. The method as claimed in claim 1, wherein at least some of the received signals corresponding to the plurality of received signal blocks are subjected block by block to at least one Fourier transformation.

8. The method as claimed in claim 1, wherein the transceiver is used to monitor an interior of a vehicle and/or the transceiver is used to detect surroundings of a vehicle.

9. The method as claimed in claim 1, wherein at least some of the ascertained information about the monitoring area is transferred to a control device of a vehicle with which the transceiver is associated.

10. A contactlessly operating transceiver for monitoring the at least one monitoring area, comprising:

at least one transmitter for successively transmitting the multiplicity of transmission signals into the at least one monitoring area;

at least one receiver for receiving the transmission signals reflected in the at least one monitoring area, and for converting the received transmission signals into the received signals that can be processed using signal converter; and at least one signal processor for allocating at least some of the received signals to at least one signal block and for ascertaining information about the at least one monitoring area from at least some of the received signals, wherein the transceiver comprises means for carrying out the method as claimed claim 1.

11. The transceiver as claimed in claim 10, wherein:

the at least one transmitter is configured to transmit electromagnetic transmission signals, and the at least one receiver is configured to receive and convert reflected electromagnetic transmission signals.

12. A vehicle having at least one contactlessly operating transceiver for monitoring a monitoring area for objects, the at least one transceiver comprising:

at least one transmitter for successively transmitting the multiplicity of transmission signals into the at least one monitoring area;

at least one receiver for receiving the transmission signals reflected in the at least one monitoring area and for converting the received transmission signals into the received signals processed using a signal converter, and at least one signal processor for allocating at least some of the received signals to at least one signal block and for ascertaining information about the at least one monitoring area from at least some of the received signals, wherein the transceiver comprises means for carrying out the method as claimed claim 1.

13. The vehicle as claimed in claim 12, wherein at least one transceiver is a surroundings transceiver and/or the at least one transceiver is an interior transceiver.

* * * * *